US011837870B2

(12) United States Patent
Konishi

(10) Patent No.: US 11,837,870 B2
(45) Date of Patent: Dec. 5, 2023

(54) POWER MANAGEMENT SYSTEM, POWER MANAGEMENT METHOD, AND POWER MANAGEMENT PROGRAM

(71) Applicant: IHI Corporation, Tokyo (JP)

(72) Inventor: Misako Konishi, Tokyo (JP)

(73) Assignee: IHI CORPORATION, Tokyo (JP)

(*) Notice: Subject to any disclaimer, the term of this patent is extended or adjusted under 35 U.S.C. 154(b) by 204 days.

(21) Appl. No.: 17/405,099

(22) Filed: Aug. 18, 2021

(65) Prior Publication Data

US 2022/0060026 A1 Feb. 24, 2022

(30) Foreign Application Priority Data

Aug. 24, 2020 (JP) .................................. 2020-140742

(51) Int. Cl.
*H02J 3/46* (2006.01)
*G05B 13/02* (2006.01)
*H02J 3/24* (2006.01)

(52) U.S. Cl.
CPC .............. *H02J 3/46* (2013.01); *G05B 13/026* (2013.01); *H02J 3/24* (2013.01)

(58) Field of Classification Search
CPC ...... H02J 3/46; H02J 3/24; H02J 3/003; H02J 3/004; H02J 3/381; H02J 2310/10; G05B 13/026
See application file for complete search history.

(56) References Cited

U.S. PATENT DOCUMENTS 9,638,545 B2 * 5/2017 Furukawa .......... H02J 13/00028
2011/0137482 A1 * 6/2011 Toba .......................... H02J 3/46
700/291

(Continued)

FOREIGN PATENT DOCUMENTS

CN 103475030 A * 12/2013
CN 103475030 A 12/2013
(Continued)

OTHER PUBLICATIONS

Ji et al., "Coordinated control and power management of diesel-PV-battery in hybrid stand-alone microgrid system", Journal, Institute of Engineering & Technology, Zhenjiang, People's Republic of China (2019).

(Continued)

*Primary Examiner* — Mohammad Ali
*Assistant Examiner* — Dhruvkumar Patel
(74) *Attorney, Agent, or Firm* — Volpe Koenig

(57) ABSTRACT

An EMS includes a control unit that controls a power generation facility and a power adjustment unit that adjusts an amount of supply of supply power. The control unit includes: a reverse power flow suppression process determination unit; a priority decision unit that decides a priority for adjusting an amount of power generated for the two power generation devices of the power generation facility on the basis of a predicted degree of fluctuation in load power; and a device control unit that controls the power generation facility such that the amount of power generated is adjusted in descending order of the priority decided by the priority decision unit when the reverse power flow suppression process determination unit determines to reduce the amount of power generated by the power generation facility.

17 Claims, 8 Drawing Sheets

(56) References Cited

U.S. PATENT DOCUMENTS

| | | | |
|---|---|---|---|
| 2012/0235478 A1 | 9/2012 | Hayashida | |
| 2013/0024034 A1* | 1/2013 | Iino | H02J 3/381 |
| | | | 700/297 |
| 2013/0313902 A1* | 11/2013 | Sako | H02J 9/06 |
| | | | 307/23 |
| 2014/0200723 A1* | 7/2014 | Roy | H02J 3/46 |
| | | | 700/291 |
| 2016/0313716 A1* | 10/2016 | Chen | H02J 4/00 |
| 2017/0187191 A1* | 6/2017 | Kojima | H02J 3/46 |
| 2019/0052085 A1 | 2/2019 | Kuboyama | |
| 2021/0075216 A1 | 3/2021 | Matsuo et al. | |

FOREIGN PATENT DOCUMENTS

| | | |
|---|---|---|
| CN | 111555366 A | 8/2020 |
| JP | 2004-180467 A | 6/2004 |
| JP | 2006-296097 A | 10/2006 |
| JP | 2008-125295 A | 5/2008 |
| JP | 2008-154334 A | 7/2008 |
| JP | 2013-027285 A | 2/2013 |
| JP | 2013-192277 A | 9/2013 |
| JP | 2014-045636 A | 3/2014 |
| JP | 2014-168328 A | 9/2014 |
| JP | 2016-226120 A | 12/2016 |
| JP | 2017-046388 A | 3/2017 |
| JP | 2017-099148 A | 6/2017 |
| JP | 2017-163795 A | 9/2017 |
| JP | 2017-169349 A | 9/2017 |
| JP | 2017163795 A * | 9/2017 |
| JP | 6414870 B1 | 10/2018 |
| JP | 2019-033562 A | 2/2019 |
| WO | 2012/090365 A1 | 7/2012 |
| WO | 2014/057867 A1 | 4/2014 |
| WO | 2017/179178 A1 | 10/2017 |

OTHER PUBLICATIONS

IHI Plant Services Corporation, "Photovoltaic power plant that we can recommend as a corporation involving power generation business," IHI Technical Report, vol. 55, No. 4 (2015), pp. 42-45.

Kazumasa Hirose, Akira Kanbe, Toru Satoh, "PV Output Power Smoothing System using the Battery," Aichi Electric Technical Report, No. 36 (2015), pp. 24-29.

Toshiya Nanhara, "Effect of smoothing photovoltaic power output fluctuation," Report prepared by Central Research Institute of Electric Power Industry, 2005.

* cited by examiner

POWER MANAGEMENT SYSTEM, POWER MANAGEMENT METHOD, AND POWER MANAGEMENT PROGRAM

CROSS-REFERENCE TO RELATED APPLICATIONS

This application claims the benefit of priority from Japanese Patent Application No. 2020-140742, filed on Aug. 24, 2020, the entire contents of which are incorporated herein by reference.

BACKGROUND

Japanese Unexamined Patent Publication No. 2014-168328 discloses a self-sustaining system of a microgrid. The microgrid includes a natural energy generator that uses natural energy such as sunlight or wind power. The system disclosed in Japanese Unexamined Patent Publication No. 2014-168328 has a function of suppressing reverse power flow to a power system. Japanese Unexamined Patent Publication No. 2014-168328 discloses a technique in which, in the control of the operation of the natural energy generator, when the output power of an emergency generator with respect to a power supply system is equal to or less than a threshold value, the supply of power from the natural energy generator to the power supply system is stopped.

SUMMARY

A power management system according to the present disclosure includes: a control unit that controls a power generation facility including a first power generation device and a second power generation device which generates power independently of the first power generation device; and a power adjustment unit that adjusts an amount of supply of supply power to a load device which consumes generated power output by the power generation facility and the supply power supplied from a power system. The control unit includes: a determination unit that determines whether or not to execute a process of reducing an amount of power generated by the power generation facility such that reverse power does not flow to the power system; a priority decision unit that decides a priority for adjusting an amount of power generated for the first power generation device and the second power generation device of the power generation facility on the basis of a degree of fluctuation in load power predicted in the load device; and a device control unit that controls the power generation facility such that the amount of power generated is adjusted in descending order of the priority decided by the priority decision unit when the determination unit determines to execute the process of reducing the amount of power generated by the power generation facility.

DETAILED DESCRIPTION

Figure 1:
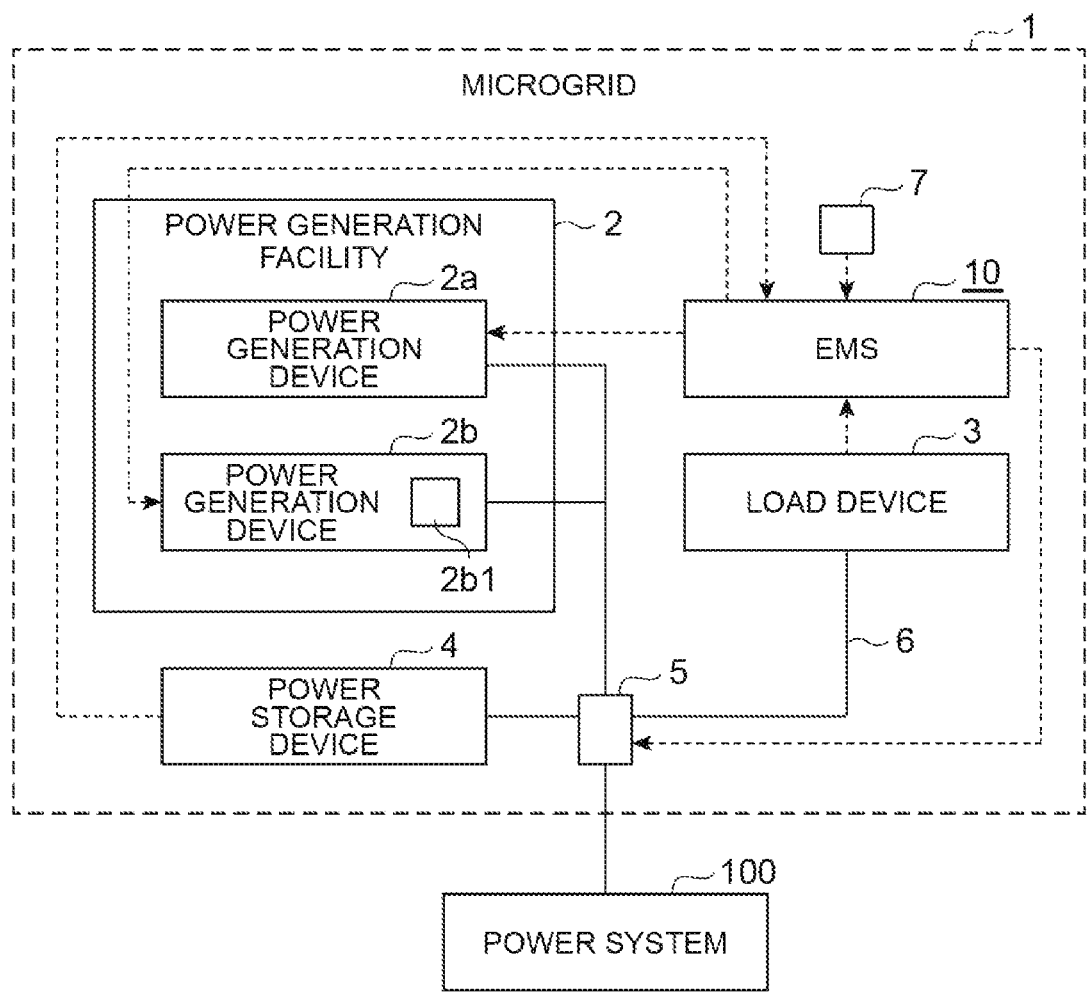
FIG. 1 is a diagram schematically illustrating the configuration of a microgrid.

In recent years, a technique related to a so-called microgrid has been studied. The microgrid includes a power source, a load device including a consumer, and a power network that connects the power source and the load device. In the microgrid, the demand of the consumers is met by the supply of the power sources. Therefore, in the microgrid, the purchase and supply of power from the power system are not essential.

The microgrid may be connected to the power system depending on its operation form. The microgrid may also supply the generated power to the power system. The supply of power to the power system is called reverse power flow. The microgrid may also be supplied with power corresponding to a shortage from the power system. When the generated power is too large for the load power, unexpected reverse power flow may occur. The reverse power flow affects the balance between supply and demand in the power system. Therefore, it is necessary to strictly manage the reverse power flow.

As control for suppressing the reverse power flow, a technique is exemplified which stops the supply of power from a power generation facility, such as a natural energy generator, to a power supply system as described in Japanese Unexamined Patent Publication No. 2014-168328. However, when load power increases suddenly, for example, while the supply of power from the power generation facility to the power supply system is stopped, a power shortage occurs. When a power shortage occurs, it is necessary to purchase power from the power system to make up the power shortage. In this case, the waste of cost is likely to occur.

In the present disclosure, a power management system, a power management method, and a power management program that can manage the balance between generated power and load power in a desired aspect will be described.

According to the present disclosure, there is provided a power management system including: a control unit that controls a power generation facility including a first power generation device and a second power generation device which generates power independently of the first power generation device; and a power adjustment unit that adjusts an amount of supply of supply power to a load device which consumes generated power output by the power generation facility and the supply power supplied from a power system. The control unit includes: a determination unit that determines whether or not to execute a process of reducing an amount of power generated by the power generation facility such that reverse power does not flow to the power system; a priority decision unit that decides a priority for adjusting an amount of power generated for the first power generation device and the second power generation device of the power generation facility on the basis of a degree of fluctuation in load power predicted in the load device; and a device control unit that controls the power generation facility such that the amount of power generated is adjusted in descending order of the priority decided by the priority decision unit when the determination unit determines to execute the process of reducing the amount of power generated by the power generation facility.

According to the present disclosure, there is provided a power management method including: a control step of controlling a power generation facility including a first power generation device and a second power generation device which generates power independently of the first power generation device; and a power adjustment step of adjusting an amount of supply of supply power to a load device which consumes generated power output by the power generation facility and the supply power supplied from a power system. The control step includes: a determination step of determining whether or not to execute a process of reducing an amount of power generated by the power generation facility such that reverse power does not flow to the power system; a priority decision step of deciding a priority for adjusting an amount of power generated for the first power generation device and the second power generation device of the power generation facility on the basis of a degree of fluctuation in load power predicted in the load device; and a device control step of controlling the power generation facility such that the amount of power generated is adjusted in descending order of the priority decided in the priority decision step when it is determined in the determination step that the process of reducing the amount of power generated by the power generation facility is executed.

According to the present disclosure, there is provided a power management program that causes a computer to function as a power management system. The computer executes: a control function of controlling a power generation facility including a first power generation device and a second power generation device which generates power independently of the first power generation device; and a power adjustment function of adjusting an amount of supply of supply power to a load device which consumes generated power output by the power generation facility and the supply power supplied from a power system. The control function includes: a process of determining whether or not to execute a process of reducing an amount of power generated by the power generation facility such that reverse power does not flow to the power system; a process of deciding a priority for adjusting an amount of power generated for the first power generation device and the second power generation device of the power generation facility on the basis of a degree of fluctuation in load power predicted in the load device; and a process of controlling the power generation facility such that the amount of power generated is adjusted in descending order of the priority when it is determined that the process of reducing the amount of power generated by the power generation facility is executed.

In the power management system, the power management method, and the power management program, the priority for adjusting the amount of power generated is decided for the first power generation device and the second power generation device of the power generation facility on the basis of the predicted degree of fluctuation in the load power. The amount of power generated by the power generation device is adjusted in descending order of the priority when a process for preventing reverse power flow is performed. Therefore, the amount of power generated is adjusted according to the degree of fluctuation in the load power. As a result, it is possible to manage the balance between the generated power and the load power in a desired aspect.

In the power management system, the first power generation device may generate power using first energy. The second power generation device may generate power using second energy different from the first energy. At least one of the first energy and the second energy may be renewable energy. According to this configuration, it is possible to manage the balance between the generated power and the load power in a desired aspect using renewable energy having a small load on the global environment.

In the power management system, when it is predicted that an amount of fluctuation in the load power per unit time will be equal to or greater than a predetermined threshold value, the priority decision unit may set the priority of the first power generation device to be higher than the priority of the second power generation device. When it is predicted that the amount of fluctuation in the load power per unit time will be less than the predetermined threshold value, the priority decision unit may set the priority of the first power generation device to be lower than the priority of the second power generation device. For example, when the amount of fluctuation in the load power per unit time is equal to or greater than the predetermined threshold value, a power shortage is likely to occur. As a result, it is likely that power needs to be supplemented by purchasing power from the power system. Therefore, according to the above-mentioned configuration, the priority for adjusting the amount of power generated is decided on the basis of whether or not it is likely that power needs to be supplemented by purchasing power from the power system. Therefore, it is possible to appropriately manage the balance between the generated power and the load power from the viewpoint of cost reduction.

In the power management system, the priority decision unit may determine one device having a small fluctuation in the amount of power generated due to a climate change as the first power generation device and the other device as the second power generation device to decide the priority for adjusting the amount of power generated. In the power management system, the priority decision unit may determine one device which is capable of increasing or decreasing the amount of power generated in a shorter time as the first power generation device and the other device as the second power generation device to decide the priority for adjusting the amount of power generated. In the power management system, the first power generation device may include a power generation amount adjustment unit that continuously adjusts the amount of power generated, and the priority decision unit may prohibit a shutdown of the first power generation device before the second power generation device is shut down when it is determined that a restart time of the first power generation device is later than a restart time of the second power generation device. In the power management system, the priority decision unit may determine one device having a large power generation capacity as the first power generation device and the other device as the second power generation device to decide the priority for adjusting the amount of power generated. According to these configurations, it is possible to appropriately manage the balance between the generated power and the load power in a desired aspect according to the aspect of each of the first power generation device and the second power generation device.

In the power management system, the priority decision unit may determine one device having a high cost of power generation as the first power generation device and the other device as the second power generation device to decide the priority for adjusting the amount of power generated. According to this configuration, it is possible to appropriately manage the balance between the generated power and the load power from the viewpoint of cost reduction.

In the power management system, the control unit may further include a data acquisition unit that acquires data related to an energy storage device storing energy associated with the power generated by the power generation facility.

The energy storage device may output a constant output power to the load device. When the amount of fluctuation in the load power per unit time is equal to or greater than the output power, the priority decision unit may determine that the amount of fluctuation is equal to or greater than the predetermined threshold value. According to this configuration, it is possible to manage the balance between the generated power and the load power in a desired aspect while more effectively operating the power generation facility.

The power management system, the power management method, and the power management program according to the present disclosure can manage the balance between the generated power and the load power in a desired aspect.

Hereinafter, a power management system, a power management method, and a power management program according to the present disclosure will be described with reference to the drawings. In the description of the drawings, the same elements or the corresponding elements are denoted by the same reference numerals. In some cases, duplicate descriptions are omitted. The power management system, the power management method, and the power management program according to the present disclosure are used for a microgrid. In the following description, the power management system is also referred to as an "energy management system" (EMS).

[Microgrid]

The microgrid will be described with reference to FIG. 1. FIG. 1 is a diagram schematically illustrating the configuration of the microgrid. A microgrid 1 includes a power generation facility 2, a load device 3, a power storage device 4 (energy storage device), a power adjustment device 5, a power transmission network 6, a weather prediction device 7, and an energy management system (EMS) 10. The power transmission network 6 connects the power generation facility 2, the load device 3, the power storage device 4, and the power adjustment device 5. The EMS 10 controls the power generation facility 2, the load device 3, the power storage device 4, the power adjustment device 5, the power transmission network 6, and the weather prediction device 7. In the microgrid 1, the load device 3 consumes the generated power output by the power generation facility 2. This relationship is a so-called "local-production-for-local-consumption" relationship.

Ideally, the microgrid 1 is operated such that the generated power output by the power generation facility 2 is equal to load power consumed by the load device 3. The EMS 10 adjusts the generated power and the load power. The EMS 10 basically adjusts the generated power and the load power such that the generated power does not exceed the load power. The EMS 10 may adjust the charging and discharging of a storage battery. The storage battery functions as a buffer between the generated power and the load power.

The microgrid 1 may be connected to a power system 100 if necessary. When the microgrid 1 is connected to the power system 100, it can be supplied with power corresponding to a shortage from the power system 100. The outflow of power from the microgrid 1 to the power system 100 is called reverse power flow. The reverse power flow affects the balance between the supply and demand of power in the power system 100. Therefore, the reverse power flow does not basically occur.

The operation form of the microgrid 1 may be flexibly changed. The microgrid 1 may be configured such that all of the required power is supplied by the power generation facility 2. The microgrid 1 may be supplied with a portion of the required power from the power system 100. The microgrid 1 may be configured such that all of the generated power is consumed by the load device 3.

The power generation facility 2 includes a power generation device 2a and a power generation device 2b. The power generation device 2a according to the present disclosure generates power using renewable energy which is first energy. Examples of the renewable energy include sunlight and wind power. The power generation device 2a is, for example, a photovoltaic (PV) device. The power generation device 2a includes a plurality of photovoltaic panels. In the power generation device 2a, the number of photovoltaic panels to be operated is changed to adjust the amount of power generated. When the photovoltaic panel in an off state is operated again, the photovoltaic panel may be required to start to output power after a standby period of 5 minutes or more has elapsed since the reception of an operation start command.

The power generation device 2b generates power independently of the power generation device 2a. The power generation device 2b according to the present disclosure generates power using second energy different from the first energy. The second energy is, for example, geothermal heat. The second energy may be renewable energy. The power generation device 2b is, for example, a binary power generation device. The power generation device 2b has an adjustment valve 2b1 (power generation amount adjustment unit) that continuously adjusts the amount of power generated. The power generation device 2b changes the degree of opening of the adjustment valve 2b1 to adjust the amount of power generated.

The power generation device 2a and the power generation device 2b are not limited to the above examples. The power generation device according to the present disclosure is not limited to the device that generates power using renewable energy. For example, the power generation facility 2 may include a diesel power generation device. For example, at least one of the power generation device 2a and the power generation device 2b of the power generation facility 2 may be a diesel power generation device. The power generation facility 2 may further include a diesel power generation device in addition to the power generation device 2a and the power generation device 2b.

The load device 3 is connected to the power generation facility 2, the power storage device 4, and the power system 100 through the power adjustment device 5. The load device 3 consumes the generated power output by the power generation facility 2 and supply power supplied from the power system 100 to perform a desired operation.

The power storage device 4 stores the generated power output by the power generation facility 2. The power storage device 4 charges and discharges the power generated by the power generation facility 2. For example, the power storage device 4 outputs a constant amount of output power to the load device 3. The microgrid 1 may include a device that produces an energy carrier other than electricity using the generated power output by the power generation facility 2 instead of the power storage device 4. The energy carrier is, for example, hydrogen or ammonia. In addition, the microgrid 1 may include a device that stores or supplies the produced energy carrier.

The power adjustment device 5 is connected to the power generation facility 2, the load device 3, the power storage device 4, and the power system 100. The power adjustment device 5 is controlled by the EMS 10. The controlled power adjustment device 5 outputs predetermined power to the load device 3. The predetermined power can include the power generated by the power generation facility 2, the output power of the power storage device 4, and the supply power of the power system 100. For example, the power adjustment device 5 outputs a constant amount of output power output by the power storage device 4 and a portion of the power generated by the power generation facility 2 to the load device 3. A portion of the generated power output from the power adjustment device 5 to the load device 3 corresponds to a shortage of the output power of the power storage device 4 with respect to the load power. When the load power is satisfied only by the power generated by the power generation facility 2 and the output power of the power storage device 4, the power adjustment device 5 may make up the shortage with the power supplied by the power system 100. The power adjustment device 5 may always output the power supplied by the power system 100 to the load device 3.

The weather prediction device 7 is used for control by the EMS 10. The weather prediction device 7 predicts weather information required for the power generation of at least one of the power generation device 2a and the power generation device 2b in the power generation facility 2. In the present disclosure, solar radiation information is predicted as the weather information required for the power generation of the power generation device 2a which is a photovoltaic device. For example, the weather prediction device 7 predicts the solar radiation time of a target day and a shade range as the solar radiation information. The weather prediction device 7 may independently acquire the weather prediction information. The weather prediction device 7 may acquire weather prediction information provided by an external weather forecasting organization.

[EMS]

Figure 2:
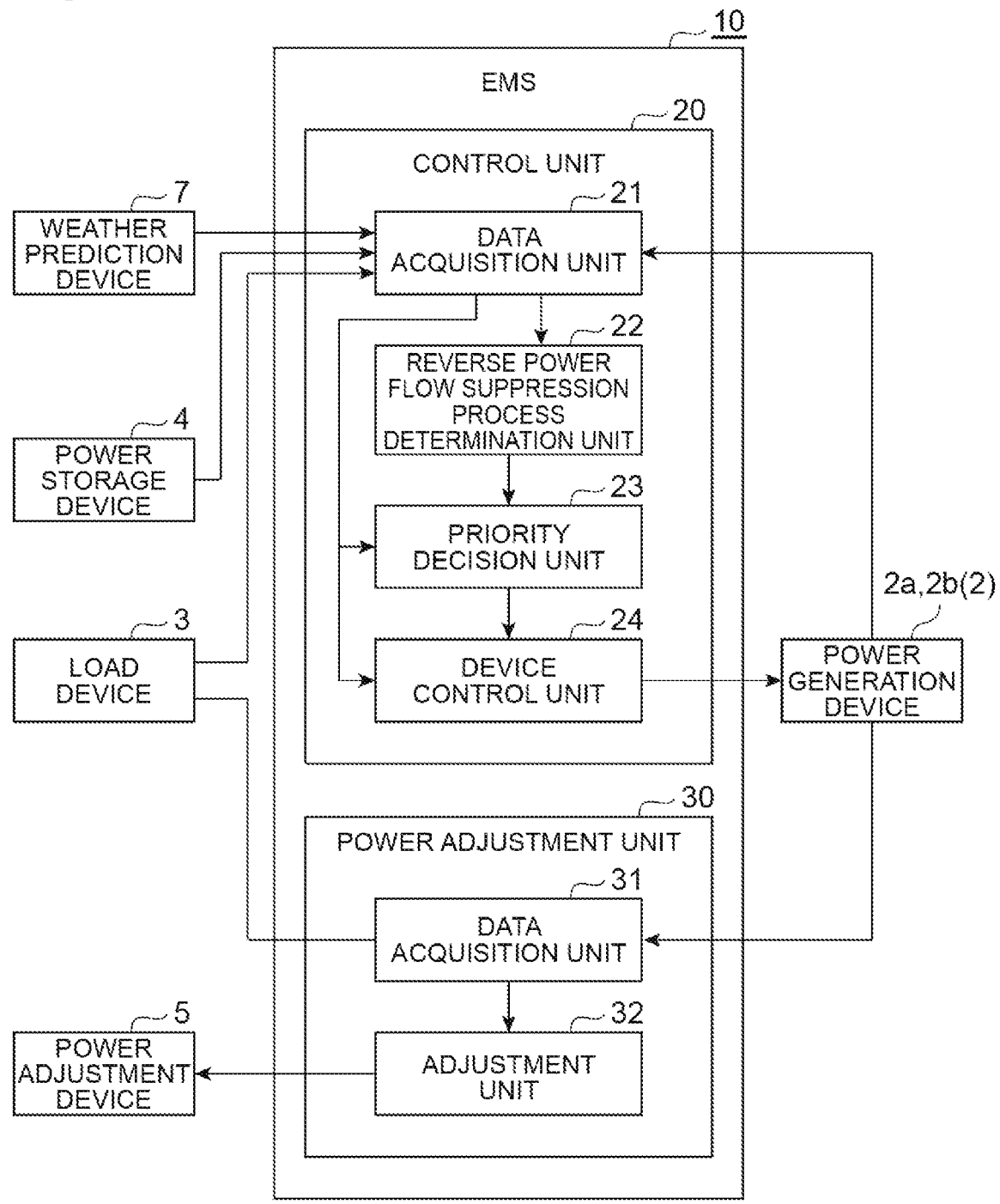
FIG. 2 is a diagram illustrating the functional configuration of an energy management system.

The EMS 10 manages the power generated by the power generation facility 2, the load power of the load device 3, the output power of the power storage device 4, and the power supplied by the power system 100. FIG. 2 illustrates the functional configuration of the EMS. The EMS 10 controls the power generation facility 2, the load device 3, the power storage device 4, the power adjustment device 5, and the weather prediction device 7. The EMS 10 controls the power generation device 2a and the power generation device 2b in the power generation facility 2.

As illustrated in FIG. 2, the EMS 10 includes a control unit 20 and a power adjustment unit 30 as functional components. The control unit 20 includes a data acquisition unit 21, a reverse power flow suppression process determination unit 22 (determination unit), a priority decision unit 23, and a device control unit 24. The power adjustment unit 30 includes a data acquisition unit 31 and an adjustment unit 32. These functional components may be combined into one computer. These functional components may be distributed to a plurality of computers.

The data acquisition unit 21 acquires information provided from the power generation device 2a, the power generation device 2b, the load device 3, the power storage device 4, and the weather prediction device 7. The data acquisition unit 21 acquires the operation schedules of the power generation device 2a, the power generation device 2b, and the load device 3 as information. The data acquisition unit 21 acquires data indicating the features of each of the power generation device 2a and the power generation device 2b. Specific features will be described below. The data acquisition unit 21 acquires the weather prediction information from the weather prediction device 7. The data acquisition unit 21 acquires the operation schedules from the power generation device 2a, the power generation device 2b, and the load device 3. The data acquisition unit 21 acquires data indicating a state of charge (SOC) from the power storage device 4.

The reverse power flow suppression process determination unit 22 determines whether or not to perform a process of reducing the amount of power generated by the power generation facility 2 such that the reverse power flow to the power system 100 does not occur. The process of reducing the amount of power generated is referred to as a "reverse power flow suppression process". The reverse power flow suppression process determination unit 22 may determine whether or not to perform the reverse power flow suppression process using any means. The reverse power flow suppression process determination unit 22 may determine that the reverse power flow suppression process is performed when a numerical value indicating the state of charge of the power storage device 4 acquired by the data acquisition unit 21 is equal to or greater than a predetermined value. The reverse power flow suppression process determination unit 22 may constantly monitor the supply power purchased from the power system 100 and determine that the reverse power flow suppression process is performed when the supply power is equal to or less than a predetermined value. The reverse power flow suppression process determination unit 22 may execute a process of predicting whether or not to perform the reverse power flow suppression process with reference to the operation schedules of the power generation device 2a, the power generation device 2b, and the load device 3 acquired by the data acquisition unit 21.

The priority decision unit 23 gives a priority for adjusting the amount of power generated to each of the power generation device 2a and the power generation device 2b of the power generation facility 2 on the basis of the predicted degree of fluctuation in the load power of the load device 3. First, the priority decision unit 23 determines one of the power generation device 2a and the power generation device 2b as a first power generation device on the basis of the features of each of the power generation device 2a and the power generation device 2b. In addition, the priority decision unit 23 determines the other of the power generation device 2a and the power generation device 2b as a second power generation device. Table 1 shows the specific features of the criteria for determining the first power generation device and the criteria for determining the second power generation device. The priority decision unit 23 compares the power generation device 2a and the power generation device 2b using the highest-level features illustrated in Table 1. One of the power generation devices is determined to be the first power generation device and the other is determined to be the second power generation device on the basis of the result of the comparison. For example, when it is difficult to determine the power generation devices using the comparison based on feature 1, the priority decision unit 23 performs the comparison based on feature 2 which is another feature. One of the power generation devices is determined to be the first power generation device and the other is determined to be the second power generation device on the basis of the result of the comparison.

TABLE 1

| | First power generation device | Second power generation device |
|---|---|---|
| Feature 1: cost of power generation | High | Low |

TABLE 1-continued

| | First power generation device | Second power generation device |
|---|---|---|
| Feature 2: output stability | High | Low |
| Feature 3: power generation amount increase-decrease rate | High | Low |
| Feature 4: restart time | Short | Long |
| Feature 5: capacity | Large | Small |

In Table 1, output stability means the degree of stability of the amount of power generated according to climate change. For example, the amount of power generated by a photovoltaic device changes rapidly depending on solar radiation conditions. The amount of power generated by a wind power generation device changes rapidly depending on wind conditions. On the other hand, the amount of power generated by a binary power generation device is stable, for example, when a heat source is geothermal heat from underground water.

A power generation amount increase-decrease rate means the degree to which the amount of power generated per unit time can be adjusted. For example, in the case of a binary generator, the power generation amount increase-decrease rate is 20 kW/sec. In the case of a diesel generator, the power generation amount increase-decrease rate is 40 kW/sec. This example is based on the assumption that the amount of power generated by the binary generator is smaller than the amount of power generated by the diesel generator. The above-mentioned relationship is an example. The above-mentioned relationship depends on the capacity of the generator rather than the type of generator. The power generation amount increase-decrease rate may be considered when the amount of power generated can be continuously adjusted. When the amount of power generated by only one of two power generation devices to be compared can be continuously adjusted, the power generation device whose power generation amount can be continuously adjusted may be determined to be the first power generation device, and the other power generation device may be determined to be the second power generation device.

A restart time means the time until the next power generation becomes possible after the power generation device is turned off. For example, in the case of the photovoltaic device, the restart time means the time until the photovoltaic panel whose operation has been stopped can generate power after the operation of the photovoltaic panel is stopped. In the case of the binary power generation device, the diesel power generation device, or the like, the restart time means the time until the power generation device whose operation has been stopped can generate power after the operation of the photovoltaic panel is stopped. The restart time may include an initialization time. In features 3 and 4, one power generation device that can increase or decrease the amount of power generated in a shorter time is determined as the first power generation device, and the other power generation device is determined as the second power generation device. One power generation device having a high responsiveness when the amount of power generated is adjusted is determined as the first power generation device, and the other power generation device having a low responsiveness when the amount of power generated is adjusted is determined as the second power generation device.

A cost of power generation means the cost required for power generation. The cost required for power generation is, for example, fuel cost. For example, in a diesel power generation device and a gas turbine power generation device, fuel costs corresponding to the amount of power generated are incurred. Capacity means the maximum power that can be generated (power generation capacity).

As illustrated in feature 2 of Table 1, the priority decision unit 23 determines a device having high output stability of the power generation device 2a and the power generation device 2b as the first power generation device and determines a device having low output stability as the second power generation device. In other words, a fluctuation in the amount of power generated by the first power generation device according to a climate change is less than a fluctuation in the amount of power generated by the second power generation device.

When the output stability of the power generation device 2a is similar to the output stability of the power generation device 2b, the priority decision unit 23 determines one power generation device, which can increase or decrease the amount of power generated in a shorter time, of the power generation device 2a and power generation device 2b as the first power generation device and determines the other power generation device as the second power generation device. Specifically, features 3 and 4 in Table 1 are used. When feature 3 is used, the priority decision unit 23 determines one of the power generation device 2a and the power generation device 2b which has a high power generation amount increase-decrease rate as the first power generation device and determines the other device having a low power generation amount increase-decrease rate as the second power generation device. In feature 3, when a device that is capable of continuously adjusting the amount of power generated and a device that is not capable of continuously adjusting the amount of power generated are compared, the device that is capable of continuously adjusting the amount of power generated is determined to be the device having a high power generation amount increase-decrease rate. When feature 4 is used, the priority decision unit 23 determines a device having a short restart time as the first power generation device and determines a device having a long restart time as the second power generation device.

When features 3 and 4 are similar, the priority decision unit 23 determines a device having a high cost of power generation of the power generation device 2a and the power generation device 2b as the first power generation device and determines a device having a low cost of power generation as the second power generation device. In the present disclosure, the power generation device 2a and the power generation device 2b are different types of power generation devices. When the two power generation devices are the same type, the priority decision unit 23 determines a power generation device having a large capacity as the first power generation device and determines a power generation device having a small capacity as the second power generation device.

Table 2 shows the features illustrated in Table 1 for examples of the three types of power generation devices. As described above, the power generation device 2a is a photovoltaic device. The power generation device 2b is a binary power generation device. As illustrated in Table 2, of the power generation device 2a and the power generation device 2b, the output stability of the power generation device 2b is higher than the output stability of the power generation device 2a. Therefore, the priority decision unit 23 determines the power generation device 2b as the first power generation device and determines the power generation device 2a as the second power generation device.

TABLE 2

| | Output stability | Power generation amount increase-decrease rate | Restart time | Cost of power generation |
|---|---|---|---|---|
| Photovoltaic generation | Low | (Unadjustable) | About 5 minutes | Not required |
| Binary power generation | High | (Adjustable) | About 20 minutes | Not required |
| Diesel power generation | High | (Adjustable) | About 2 minutes | Required |

As illustrated in Table 2, the point that a power generation amount increase-decrease rate in photovoltaic generation is unadjustable is a condition that is temporarily set for the convenience of the explanation of the present disclosure. Therefore, the point that the power generation amount increase-decrease rate in photovoltaic generation is unadjustable is unusual. In Table 2, a power generation amount increase-decrease rate in binary power generation and a power generation amount increase-decrease rate in diesel power generation are adjustable. However, there are binary power generation and diesel power generation in which the power generation amount increase-decrease rate is unadjustable.

After determining one of the power generation device 2a and the power generation device 2b as the first power generation device and the other as the second power generation device, the priority decision unit 23 sets a priority for adjusting the amount of power generated for the first power generation device and the second power generation device. Specifically, the priority decision unit 23 sets the priority of the first power generation device to be higher than the priority of the second power generation device when it is predicted that a state in which the amount of fluctuation in the load power per unit time is equal to or greater than a predetermined threshold value will occur for a target management period. On the contrary, the priority decision unit 23 sets the priority of the first power generation device to be lower than the priority of the second power generation device when it is predicted that only a state in which the amount of fluctuation in the load power per unit time is less than the predetermined threshold value will occur for the target management period. As an example, the predetermined threshold value is set according to the rated output of the power storage device 4. For example, the priority decision unit 23 determines that the amount of fluctuation in the load power per unit time is equal to or greater than the predetermined threshold value when the amount of fluctuation is equal to or greater than the output power of the power storage device 4.

When it is determined that the restart time of the first power generation device is shorter than the restart time of the second power generation device, the priority decision unit 23 may prohibit the operation of the first power generation device from being stopped before the operation of the second power generation device is stopped.

The device control unit 24 controls the power generation device 2a and the power generation device 2b such that the amount of power generated is adjusted. Specifically, the device control unit 24 controls at least one of the power generation device 2a and the power generation device 2b when the reverse power flow suppression process determination unit 22 determines to perform the reverse power flow suppression process. More specifically, the device control unit 24 adjusts the amount of power generated in descending order of the priority decided by the priority decision unit 23. For example, when reducing the amount of power generated by the power generation device 2a, the device control unit 24 controls the power generation device 2a such that the number of photovoltaic panels in an operating state is reduced. When reducing the amount of power generated by the power generation device 2b, the device control unit 24 controls the power generation device 2b such that the degree of opening of the adjustment valve 2b1 is reduced. The device control unit 24 controls the power generation device 2a and the power generation device 2b such that the amount of power generated is restored when the reverse power flow suppression process determination unit 22 determines to end the reverse power flow suppression process.

The data acquisition unit 31 acquires information related to power from the power generation device 2a, the power generation device 2b, and the load device 3. Specifically, the data acquisition unit 31 acquires the amount of power generated by the power generation device 2a, the amount of power generated by the power generation device 2b, and the amount of load power required for the load device.

The adjustment unit 32 controls the power adjustment device 5 such that predetermined power that can include the power generated by the power generation facility 2, the output power of the power storage device 4, and the supply power of the power system 100 is output to the load device 3. The adjustment unit 32 controls the power adjustment device 5 such that the amount of supply power supplied from the power system 100 is adjusted. Specifically, the adjustment unit 32 acquires the amount of power generated and the amount of power required from the data acquisition unit 31. Then, when the required amount of load power is not satisfied only by the power generated by the power generation device 2a, the power generated by the power generation device 2b, and the output power of the power storage device 4, the adjustment unit 32 controls the power adjustment device 5 such that the shortage is made up by the power supplied from the power system 100.

[Power Management Program]

Figure 3:
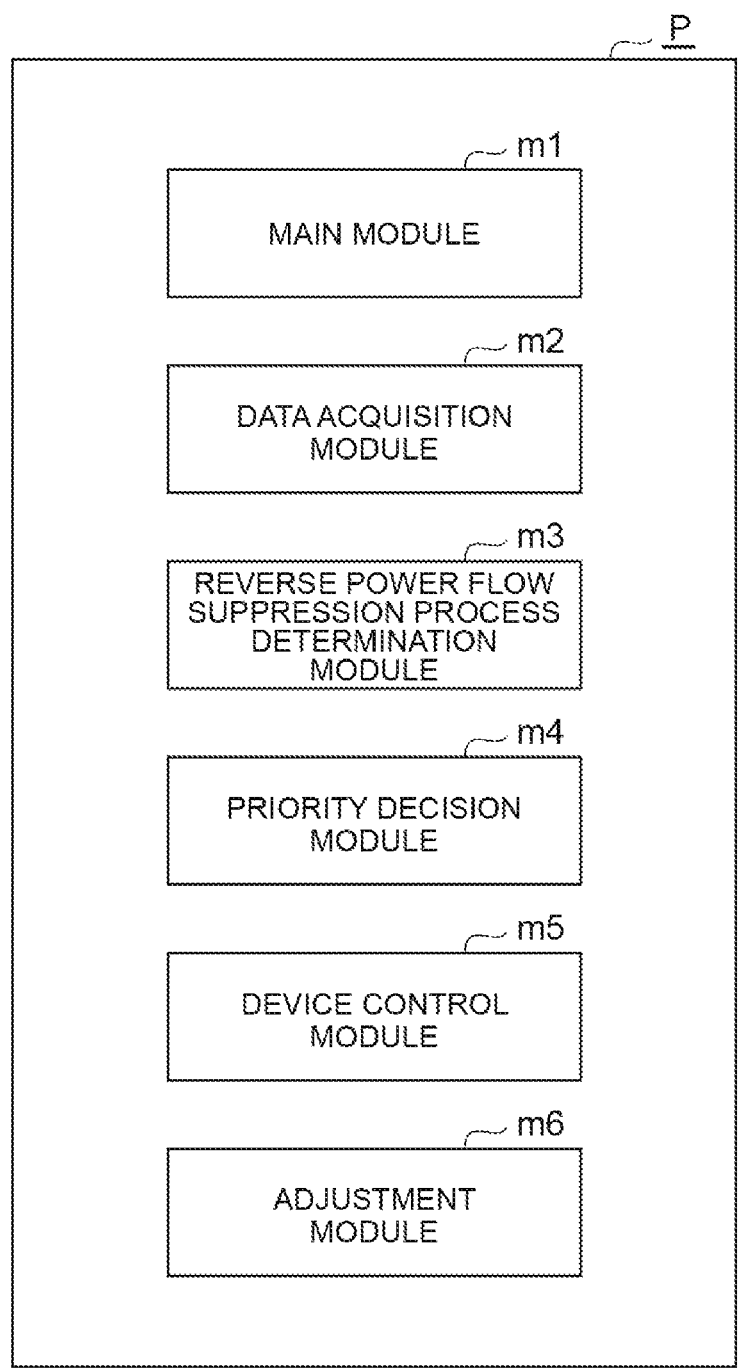
FIG. 3 is a diagram illustrating the configuration of a power management program.

Next, a power management program P that causes a computer to function as the power management system will be described. The power management program P causes the computer to function as the EMS 10. The power management program P may be transmitted through a transmission medium such as a communication line. The power management program P may be stored in a recording medium. FIG. 3 illustrates the configuration of the power management program.

As illustrated in FIG. 3, the power management program P includes a main module m1 that comprehensively controls the process executed by the EMS 10, a data acquisition module m2, a reverse power flow suppression process determination module m3, a priority decision module m4, a device control module m5, and an adjustment module m6. The functions of the data acquisition unit 21, the reverse power flow suppression process determination unit 22, the priority decision unit 23, the device control unit 24, the data acquisition unit 31, and the adjustment unit 32 in the EMS 10 are implemented by the modules m1 to m6. A control function for controlling the power generation facility 2 is implemented by the modules m1 to m6. Similarly, a power adjustment function for adjusting the amount of supply power supplied from the power system 100 is also implemented by the modules m1 to m6.

[Hardware Configuration]

The EMS 10 is implemented by any combination of hardware and/or software. The functions of the EMS 10 may be implemented by two or more devices that are physically and/or logically separated and are directly and/or indirectly connected.

Figure 4:
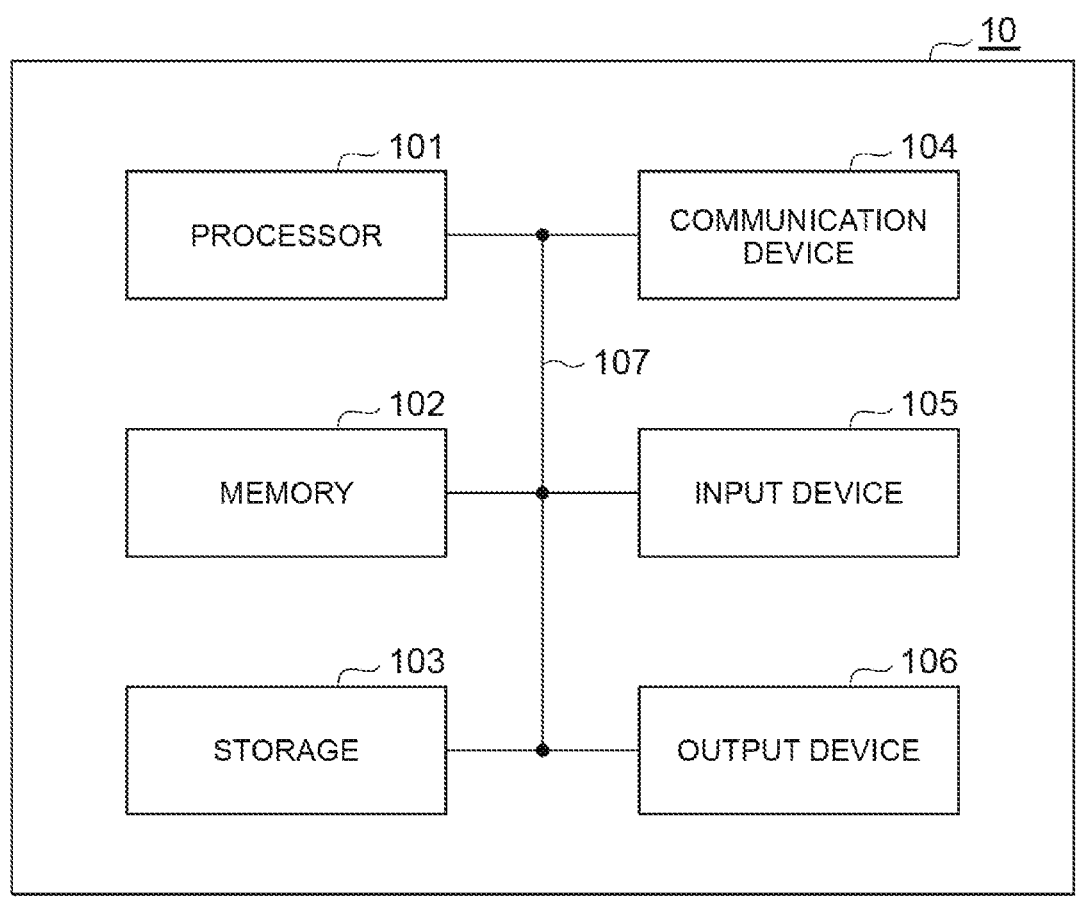
FIG. 4 is a diagram illustrating an example of the hardware configuration of the energy management system.

FIG. 4 illustrates an example of the hardware configuration of the EMS. As illustrated in FIG. 4, the EMS 10 may be configured as a computer device. The computer device physically includes a processor 101, a memory 102, a storage 103, a communication device 104, an input device 105, an output device 106, and a bus 107. The functions of the EMS 10 are implemented by controlling an operation of reading predetermined software (program) onto hardware, such as the processor 101 and the memory 102, a calculation operation of the processor 101, a communication operation of the communication device 104, and a data reading operation and a data writing operation in the memory 102 and the storage 103.

For example, the processor 101 operates an operating system to control the entire computer. The processor 101 may be configured by a central processing unit (CPU). For example, various processes of the EMS 10 may be implemented by the processor 101. The processor 101 reads a program (program code), a software module, and data from the storage 103 or the communication device 104 to the memory 102. Then, the processor 101 performs various processes. A function of performing various processes of the EMS 10 may be implemented by a control program which is stored in the memory 102 and is operated by the processor 101. Various processes of the EMS 10 may be performed by one processor 101. Various processes of the EMS 10 may be performed simultaneously or sequentially by two or more processors 101.

The memory 102 is a computer-readable recording medium. The memory 102 may be configured by, for example, at least one of a read only memory (ROM), an erasable programmable ROM (EPROM), an electrically erasable programmable ROM (EPROM), and a random access memory (RAM).

The storage 103 is a computer-readable recording medium. The storage 103 may be configured by at least one of a hard disk drive, a flexible disk, a magneto-optical disk, and an optical disk such as a compact disc ROM (CD-ROM). The above-mentioned storage medium may be, for example, a database, a server, or other appropriate media including the memory 102, the storage 103, and the like.

The communication device 104 performs communication between computers through a wired and/or wireless network. For example, some of the various processes of the EMS 10 may be implemented by the communication device 104.

The input device 105 receives information input from the outside. The input device 105 is, for example, a keyboard. The output device 106 outputs information to the outside. The output device 106 is, for example, a display.

The above-mentioned devices are connected to each other by the bus 107 for information communication. The bus 107 may be configured as a single bus. The bus 107 may be configured as a plurality of buses that differ between the devices.

[Power Management Method]

Figure 5:
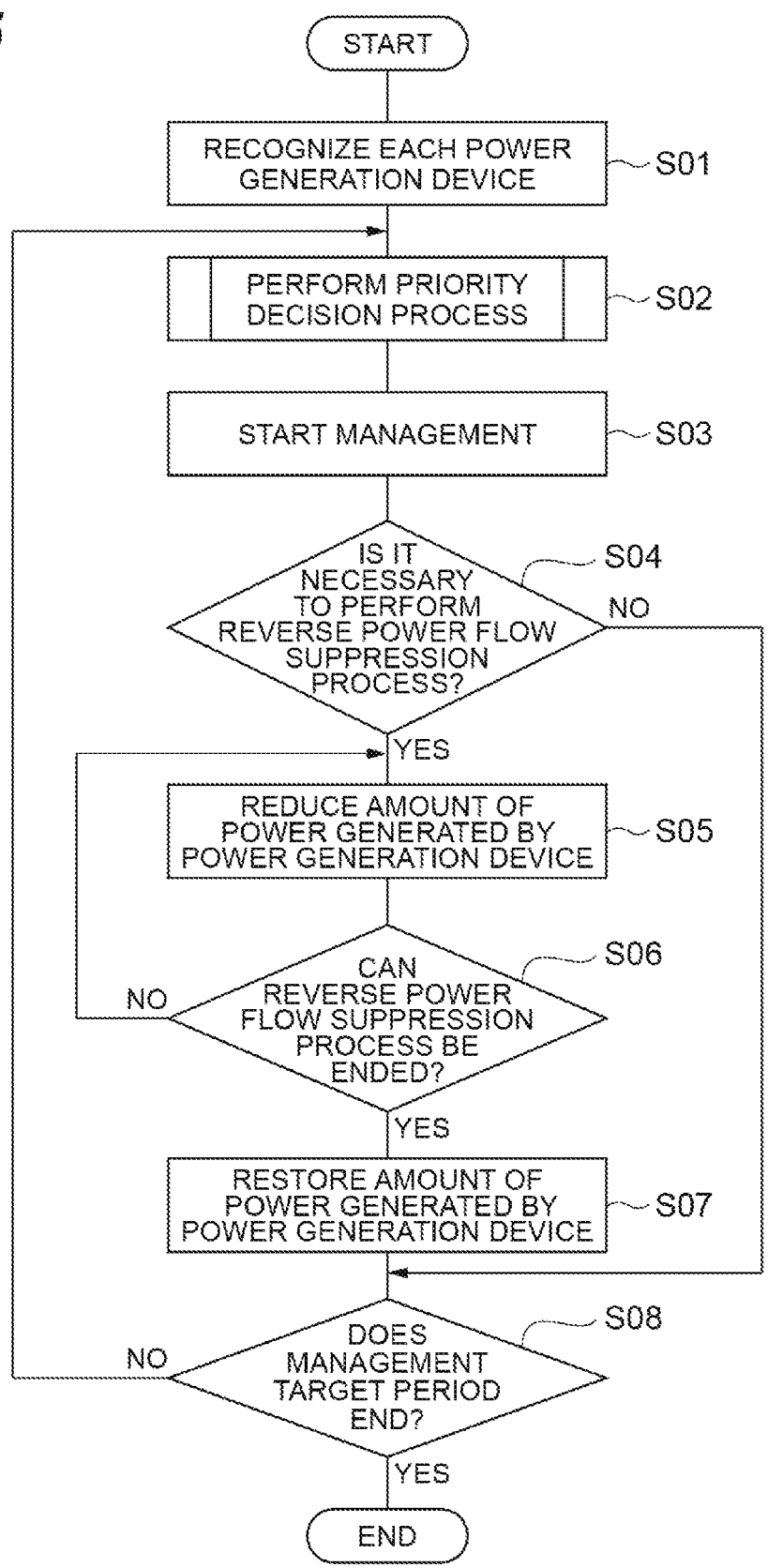
FIG. 5 is a flowchart illustrating a power management process.

As an example of the power management method, the outline of a power management process performed by the EMS 10 will be described. FIG. 5 is a flowchart illustrating the power management process. As illustrated in FIG. 5, the EMS 10 executes Step S01 first. In Step S01, the data acquisition unit 21 and the priority decision unit 23 recognize the power generation device 2a and the power generation device 2b. Specifically, the data acquisition unit 21 acquires data indicating the features of each of the power generation device 2a and the power generation device 2b. Then, the priority decision unit 23 determines one of the power generation device 2a and the power generation device 2b as the first power generation device and determines the other as the second power generation device on the basis of the acquired data. In the present disclosure, the priority decision unit 23 determines the power generation device 2b as the first power generation device and determines the power generation device 2a as the second power generation device on the basis of Tables 1 and 2.

Then, the EMS 10 executes Step S02. In Step S02, the priority decision unit 23 decides the priority for adjusting the amount of power generated for the power generation device 2a and the power generation device 2b of the power generation facility 2 on the basis of the predicted degree of fluctuation in the load power of the load device 3 (priority decision step). In addition, the specific processing content of Step S02 will be described below.

Then, the EMS 10 executes Step S03 and then executes Step S04. In Step S03, the reverse power flow suppression process determination unit 22, the device control unit 24, and the adjustment unit 32 recognize that a power management period has started. Specifically, the device control unit 24 controls the power generation device 2a and the power generation device 2b of the power generation facility 2 such that power generation is started (control step). The adjustment unit 32 controls the power adjustment device 5 such that predetermined power including the power generated by the power generation facility 2, the output power of the power storage device 4, and the supply power of the power system 100 is output to the load device 3. The adjustment unit 32 controls the power adjustment device 5 such that the amount of supply power supplied from the power system 100 is adjusted (power adjustment step).

In Step S04, the reverse power flow suppression process determination unit 22 determines whether or not it is necessary to perform the reverse power flow suppression process (determination step). The reverse power flow suppression process determination unit 22 determines to perform the reverse power flow suppression process when a value indicating the state of charge of the power storage device 4 acquired by the data acquisition unit 21 is equal to or greater than a predetermined value.

When it is determined in Step S04 that it is necessary to perform the reverse power flow suppression process (Step S04: YES), the EMS 10 executes Step S05. In Step S05, the device control unit 24 controls the power generation device 2a and the power generation device 2b such that the amount of power generated is reduced. Specifically, the device control unit 24 controls at least one of the power generation device 2a and the power generation device 2b (device control step). The device control unit 24 determines the device to be controlled on the basis of the priority decided in Step S02. Specifically, the device control unit 24 performs control to sequentially reduce the amounts of power generated by the devices in descending order of the priority. When reducing the amount of power generated by the power generation device 2a, the device control unit 24 may control the power generation device 2a such that the number of photovoltaic panels in an operating state is reduced. When reducing the amount of power generated by the power generation device 2b, the device control unit 24 may control the power generation device 2b such that the degree of opening of the adjustment valve 2b1 is reduced.

Then, the EMS 10 executes Step S06. In Step S06, the reverse power flow suppression process determination unit 22 determines whether or not the reverse power flow suppression process can be ended. The reverse power flow suppression process determination unit 22 can end the reverse power flow suppression process when the value indicating the state of charge of the power storage device 4 acquired by the data acquisition unit 21 is less than the predetermined value.

When it is determined in Step S06 that the reverse power flow suppression process is not capable of being ended (Step S06: NO), the EMS 10 returns the process to Step S05. Then, the EMS 10 repeatedly executes the processes in Step S05 and Step S06 until it is determined that the reverse power flow suppression process can be ended.

When it is determined in Step S06 that the reverse power flow suppression process can be ended (Step S06: YES), the EMS 10 executes Step S07. In Step S07, the device control unit 24 controls at least one of the power generation device 2a and the power generation device 2b such that the amount of power generated is restored.

When Step S07 ends, the EMS 10 executes Step S08. In addition, even when it is determined in Step S04 that it is not necessary to perform the reverse power flow suppression process (Step S04: NO), the EMS 10 also executes Step S08. In Step S08, the reverse power flow suppression process determination unit 22, the device control unit 24, and the adjustment unit 32 determine whether or not a target period for power management has ended. The target period is, for example, one day. When the target period has not ended (Step S08: NO), the EMS 10 returns the process to Step S02. Then, the EMS 10 repeatedly executes the processes in Step S02, Step S03, Step S04, Step S05, Step S06, Step S07, and Step S08 until the target period ends. When the target period has ended (Step S08: YES), the EMS 10 completes the control on the power management process.

When the EMS 10 recognizes the processing content performed in Step S01, the EMS 10 may omit Step S01. When the target period is one day, for example, Step S02 may be executed only once in the morning of the target day, and Step S02 may be omitted until the management period ends.

[Priority Decision Process]

Figure 6:
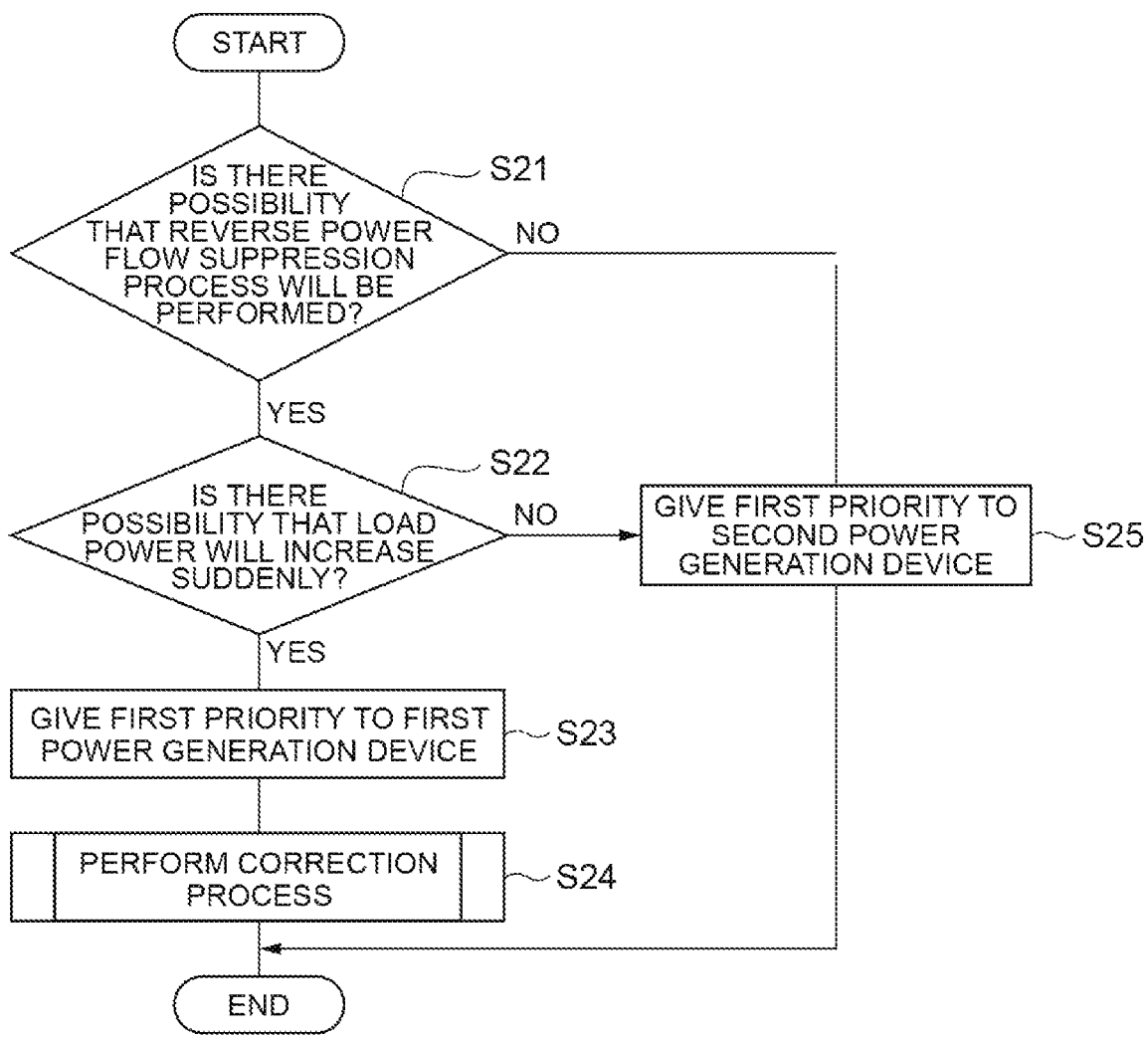
FIG. 6 is a flowchart illustrating a priority decision process.

Next, an example of the specific processing content of Step S02 will be described. FIG. 6 is a flowchart illustrating a priority decision process. As illustrated in FIG. 6, the EMS 10 executes Step S21. In Step S21, the EMS 10 determines whether or not the possibility that the reverse power flow suppression process will be performed is equal to or greater than a predetermined value within the target period of power management. The specific processing content of Step S21 will be described below.

When it is determined in Step S21 that the possibility that the reverse power flow suppression process will be performed is equal to or greater than the predetermined value within the target period of power management (Step S21: YES), the EMS 10 executes Step S22. In Step S22, the priority decision unit 23 predicts whether or not the amount of fluctuation in the load power per unit time is equal to or greater than a predetermined threshold value within the target period. The priority decision unit 23 confirms the amount of fluctuation in the load power with reference to, for example, the operation schedule of the load device 3 acquired by the data acquisition unit 21. For example, when the amount of fluctuation in the load power is equal to or greater than the rated output of the power storage device 4, it may be determined that the amount of fluctuation in the load power is equal to or greater than the predetermined threshold value.

When it is predicted in Step S22 that the amount of fluctuation in the load power per unit time will be equal to or greater than the predetermined threshold value within the target period (Step S22: YES), the EMS 10 executes Step S23. In Step S23, the priority decision unit 23 determines that the first power generation device is given a first priority when the amount of power generated is adjusted. The first power generation device is the power generation device 2b which is a binary power generation device.

Then, the EMS 10 executes Step S24. In Step S24, the priority decision unit 23 executes a process of correcting the priority when the amount of power generated is adjusted. Details of Step S24 will be described below.

When it is determined in Step S21 that there is almost no possibility that the reverse power flow suppression process will be performed within the target period (Step S21: NO), the EMS 10 executes Step S25. Further, even when it is predicted in Step S22 that the amount of fluctuation in the load power per unit time will not be equal to or greater than the predetermined threshold value within the target period (Step S22: NO), the EMS 10 executes Step S25. In Step S25, the priority decision unit 23 determines that the second power generation device is given the first priority when the amount of power generated is adjusted. The second power generation device is the power generation device 2a which is a photovoltaic device. A case in which there is almost no possibility that the reverse power flow suppression process will be performed includes a case in which there is a possibility that the reverse power flow suppression process will be performed, but the possibility is negligible. Similarly, a case in which it is predicted that the amount of fluctuation in the load power per unit time will not be equal to or greater than the predetermined threshold value includes a case in which it is predicted that the amount of fluctuation in the load power per unit time will be equal to or greater than the predetermined threshold value, but the excess amount will be negligible.

In this way, the EMS 10 completes the process in Step S02. In addition, the process in Step S24 may be omitted.

[Execution Determination Process]

Figure 7:
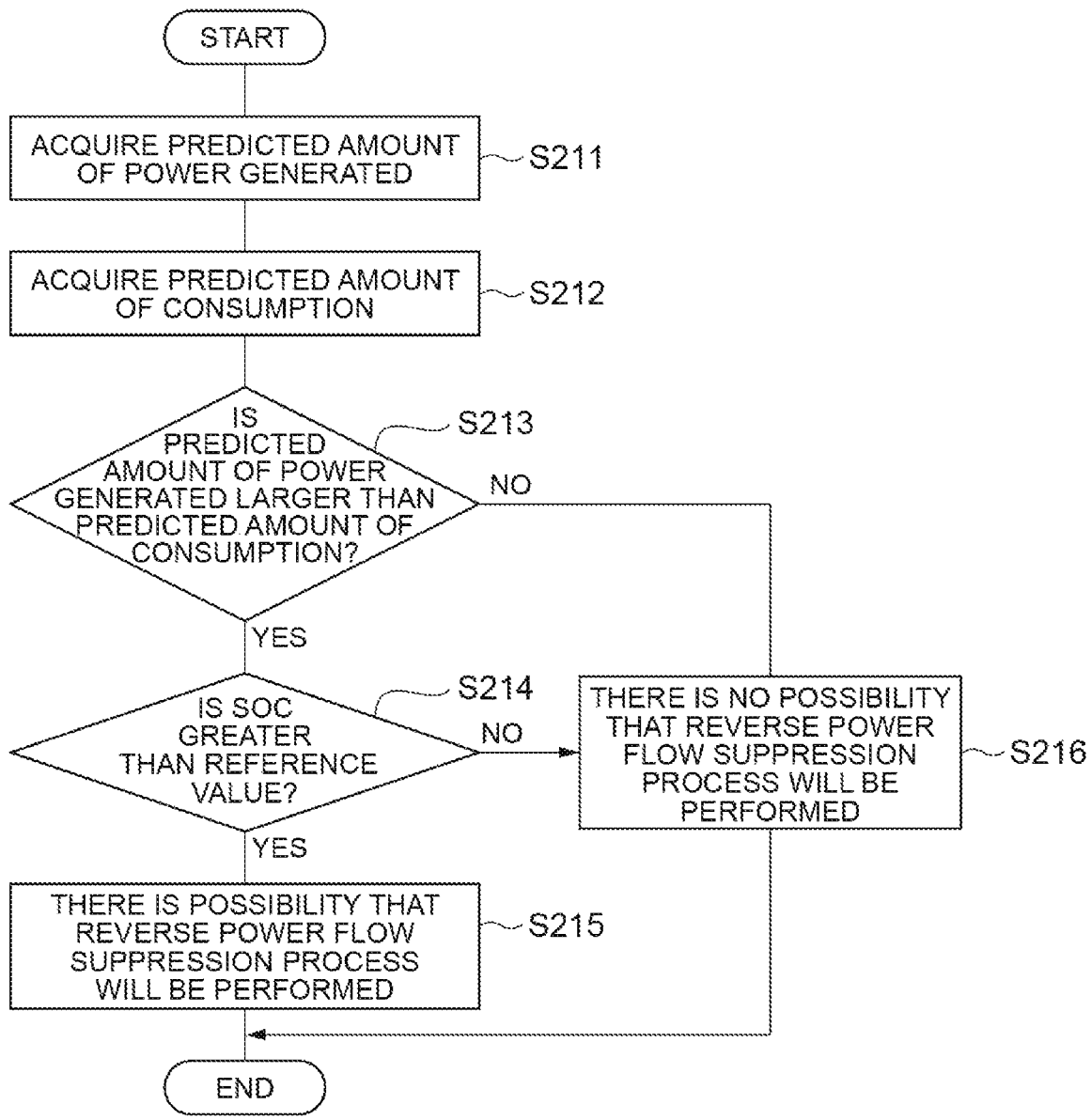
FIG. 7 is a flowchart illustrating an execution determination process.

Next, an example of the specific processing content of Step S21 will be described. FIG. 7 is a flowchart illustrating an execution determination process. As illustrated in FIG. 7, first, the EMS 10 sequentially executes Steps S211 and S212. In Step S211, the data acquisition unit 21 acquires a predicted value of the amount of power generated by the power generation facility 2 within the target period. The predicted value of the amount of power generated is referred to as a "predicted amount of power generated". Specifically, the data acquisition unit 21 refers to the operation schedules acquired from the power generation device 2a and the power generation device 2b. Then, the data acquisition unit 21 calculates the predicted amount of power generated within the target period. In Step S212, the data acquisition unit 21 acquires a predicted value of the amount of consumption by the load device 3 within the target period. The predicted value of the amount of consumption is referred to as a "predicted amount of consumption". Specifically, the data acquisition unit 21 refers to the operation schedule acquired from the load device 3. Then, the data acquisition unit 21 calculates the predicted amount of consumption within the target period. The EMS 10 may execute Step S212 before Step S211. The EMS 10 may execute Step S211 and Step S212 in parallel.

Then, the EMS 10 executes Step S213. In Step S213, the reverse power flow suppression process determination unit 22 determines whether or not the predicted amount of consumption is larger than the predicted amount of power generated. Specifically, the reverse power flow suppression process determination unit 22 compares the predicted amount of power generated which is the result of Step S211 with the predicted amount of consumption which is the result of Step S212. The reverse power flow suppression process determination unit 22 determines whether or not the predicted amount of consumption is larger than the predicted amount of power generated within the target period on the basis of this comparison.

When it is determined in Step S213 that the predicted amount of power generated is larger than the predicted amount of consumption (Step S213: YES), the EMS 10 executes Step S214. In Step S214, the reverse power flow suppression process determination unit 22 determines whether or not the state of charge (SOC) of the power storage device 4 is greater than a reference value. The reference value is, for example, 75%. The reference value may be appropriately changed.

When it is determined in Step S214 that the state of charge (SOC) of the power storage device 4 is greater than the reference value (Step S214: YES), the EMS 10 executes Step S215. In Step S215, the reverse power flow suppression process determination unit 22 determines that there is a possibility that the reverse power flow suppression process will be performed.

When it is determined in Step S213 that the predicted amount of power generated is equal to or less than the predicted amount of consumption (Step S213: NO), the EMS 10 executes Step S216. In addition, even when it is determined in Step S214 that the state of charge (SOC) of the power storage device 4 is equal to or less than the reference value (Step S214: NO), the EMS 10 executes Step S216. In Step S216, the reverse power flow suppression process determination unit 22 determines that there is no possibility that the reverse power flow suppression process will be performed. In this way, the EMS 10 completes the process in Step S21.

[Correction Process]

Figure 8:
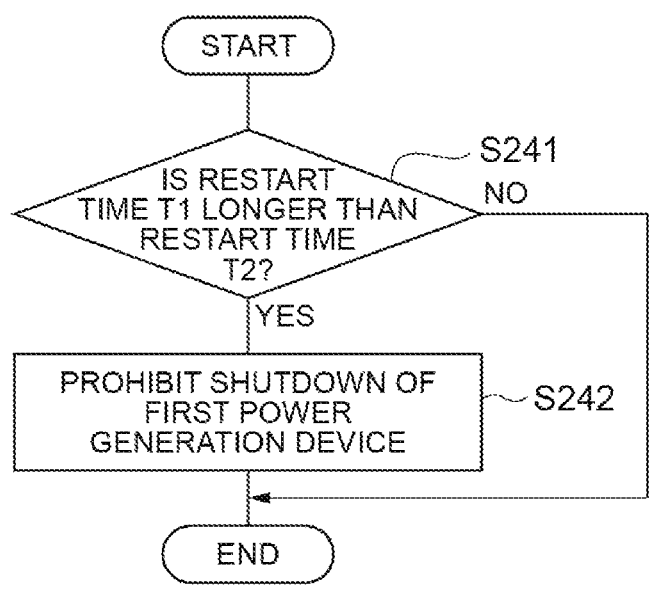
FIG. 8 is a flowchart illustrating a correction process.

Next, an example of the specific processing content of Step S24 will be described. FIG. 8 is a flowchart illustrating a correction process. As illustrated in FIG. 8, first, the EMS 10 executes Step S241. In Step S241, the priority decision unit 23 determines whether or not a restart time T1 of the first power generation device is longer than a restart time T2 of the second power generation device. Specifically, the priority decision unit 23 acquires the restart time T1 and the restart time T2 from the processing result in Step S01. Then, the priority decision unit 23 determines whether or not the restart time T1 is longer than the restart time T2.

When the priority decision unit 23 determines in Step S241 that the restart time T1 is longer than the restart time T2 (Step S241: YES), the EMS 10 executes Step S242. In Step S242, the priority decision unit 23 decides to prohibit the shutdown of the first power generation device. The priority decision unit 23 decides only to increase or decrease the amount of power generated when the amount of power generated by the first power generation device is adjusted. That is, when the adjustment of the amount of power generated for the reverse power flow suppression process is insufficient only by increasing or decreasing the amount of power generated by the first power generation device having the first priority, the amount of power generated by the second power generation device having the second priority is adjusted.

When the priority decision unit 23 determines in Step S241 that the restart time T1 is shorter than the restart time T2 (Step S241: NO), the EMS 10 completes the process in Step S24. Further, even when the process in Step S242 is completed, the EMS 10 completes the process in Step S24.

In addition, in Step S242, the priority decision unit 23 may decide to completely prohibit the shutdown of the first power generation device. The priority decision unit 23 may decide to prohibit the shutdown of the first power generation device under predetermined conditions. For example, in Step S242, the priority decision unit 23 may decide to prohibit the shutdown of the first power generation device before the second power generation device is shut down.

The first power generation device is the power generation device 2b which is a binary power generation device. The second power generation device is the power generation device 2a which is a photovoltaic device. That is, as can be seen from Table 2, the restart time T1 is about 20 minutes. The restart time T2 is about 5 minutes. Therefore, when it is determined in Step S23 that the first power generation device has the first priority, the restart time T1 is 20 minutes, and the restart time T2 is 5 minutes. Therefore, in Step S242, it is decided to prohibit the shutdown of the first power generation device. As a result, when the reverse power flow suppression process is executed, first, the degree of opening of the adjustment valve of the power generation device 2b is reduced to decrease the amount of power generated. Then, the number of photovoltaic panels operated in the power generation device 2a is reduced to decrease the amount of power generated if necessary. The power generation device 2b is shut down when the amount of adjustment of the amount of power generated is insufficient in a state in which the decrease in the amount of power generated by the degree of opening of the adjustment valve of the power generation device 2b and the decrease in the number of photovoltaic panels operated in the power generation device 2a are executed.

[Operation and Effect]

The operation and effect of the EMS 10, the power management method, and the power management program described above will be described. According to the EMS 10, the power management method, and the power management program, the priority for adjusting the amount of power generated is decided for the first power generation device and the second power generation device in the power generation facility 2 on the basis of on the predicted degree of fluctuation in the load power. The first power generation device is the power generation device 2b. The second power generation device is the power generation device 2a. When the reverse power flow suppression process is performed, the amounts of power generated by the power generation devices are adjusted in descending order of the priority. Therefore, the amount of power generated is adjusted according to the degree of fluctuation in the load power. Therefore, it is possible to manage the balance between the generated power and the load power in a desired aspect.

According to the EMS 10, the power management method, and the power management program, it is possible to effectively use the owned generators according to the amount of power generated. Therefore, it is possible to contribute to Goal 7 "Affordable and Clean Energy" of the Sustainable Development Goals (SDGs) led by the United Nations.

The first power generation device (power generation device 2b) generates power using the first energy (geothermal heat). The second power generation device (power generation device 2a) generates power using the second energy (sunlight) different from the first energy. At least one of the first energy and the second energy is renewable energy. This configuration makes it possible to manage the balance between the generated power and the load power in a desired aspect using the renewable energy having a small load on the global environment.

In the EMS 10, when it is predicted that the amount of fluctuation in the load power per unit time will be equal to or greater than the predetermined threshold value, the priority decision unit 23 sets the priority of the first power generation device to be higher than the priority of the second power generation device. When it is predicted that the amount of fluctuation in the load power per unit time will be less than the predetermined threshold value, the priority decision unit 23 sets the priority of the first power generation device to be lower than the priority of the second power generation device. For example, when the amount of fluctuation in the load power per unit time is equal to or greater than the predetermined threshold value, a power shortage occurs. As a result, it is likely that power needs to be supplemented by purchasing power from the power system 100. Therefore, according to the above-mentioned configuration, the priority for deciding the device whose power generation amount is adjusted is decided on the basis of whether or not it is likely that power needs to be supplemented by purchasing power from the power system 100. Therefore, it is possible to appropriately manage the balance between the generated power and the load power from the viewpoint of cost reduction.

According to feature 1 in Table 1, the priority decision unit 23 determines one of the power generation device 2*a* and the power generation device 2*b* which requires a high cost of power generation as the first power generation device and the other as the second power generation device to decide the priority for adjusting the amount of power generated. According to feature 5 in Table 1, the priority decision unit 23 determines one of the power generation device 2*a* and the power generation device 2*b* which has a large power generation capacity as the first power generation device and the other as the second power generation device to decide the priority for adjusting the amount of power generated. These configurations make it possible to appropriately manage the balance between the generated power and the load power in a desired aspect according to the aspect of each of the first power generation device and the second power generation device.

According to feature 2 in Table 1, the priority decision unit 23 determines one of the power generation device 2*a* and the power generation device 2*b* which has a small fluctuation in the amount of power generated due to climate change as the first power generation device and the other as the second power generation device to decide the priority for adjusting the amount of power generated. According to feature 3 or feature 4 in Table 1, the priority decision unit 23 determines one of the power generation device 2*a* and the power generation device 2*b* which can increase or decrease the amount of power generated in a shorter time as the first power generation device and the other as the second power generation device to decide the priority for adjusting the amount of power generated.

When a sudden fluctuation in the load power is predicted, the amount of power generated by the power generation device 2*b* is preferentially adjusted. The power generation device 2*b* has a higher responsiveness to an increase or decrease in the amount of power generated than the power generation device 2*a*. Therefore, even when the amount of power generated is reduced as the reverse power flow suppression process, it is easy to increase the amount of power generated by the power generation device 2*b* in response to a sudden increase in the load power. When the load increases suddenly from a state in which a portion of a power conditioner of the photovoltaic device is stopped (the amount of power generated is zero) by the suppression of the reverse power flow, it takes a predetermined time to restart the stopped power conditioner of the photovoltaic device. However, even when the generated power is suddenly insufficient with respect to the load power, it is unlikely that power needs to be supplemented by purchasing power from the power system 100 since power can be supplied from the power generation device 2*b* with high responsiveness. In addition, when a sudden fluctuation in the load power is not predicted, the amount of power generated by the power generation device 2*a* is preferentially adjusted. The output of the amount of power generated by the power generation device 2*a* is more unstable than the output of the amount of power generated by the power generation device 2*b*. Therefore, when only the amount of power generated is reduced as the reverse power flow suppression process, the amount of power generated by the power generation device 2*a* can be reduced to stabilize the amount of power generated by the entire power generation facility 2.

The power generation device 2*b* which is the first power generation device has the adjustment valve 2*b*1 that continuously adjusts the amount of power generated. When it is determined that the restart time of the first power generation device is later than the restart time of the second power generation device, the priority decision unit 23 prohibits the shutdown of the first power generation device before the second power generation device is shut down. According to this configuration, when there are a plurality of aspects for reducing the amount of power generated by the first power generation device, it is possible to further appropriately manage the balance between the generated power and the load power in a desired aspect according to the aspect of each of the first power generation device and the second power generation device.

As can be seen from Table 1, the cost required to generate power using the first power generation device is higher than the cost required to generate power using the second power generation device. This configuration makes it possible to appropriately manage the balance between the generated power and the load power from the viewpoint of cost reduction.

The control unit 20 of the EMS 10 further includes the data acquisition unit 21 that acquires data related to the power storage device 4 storing energy associated with the power generated by the power generation facility 2. The power storage device 4 outputs a constant output power to the load device 3. When the amount of fluctuation in the load power per unit time is equal to or greater than the output power, the priority decision unit 23 determines that the amount of fluctuation is equal to or greater than the predetermined threshold value. This configuration makes it possible to more effectively operate the power generation facility 2 and to manage the balance between the generated power and the load power in a desired aspect.

The above description relates to the power management system, the power management method, and the power management program according to the present disclosure. The power management system, the power management method, and the power management program according to the present disclosure are not limited to the above-mentioned examples. The power management system, the power management method, and the power management program according to the present disclosure can be modified in various manners without departing from the gist of the claims.

For example, the power generation facility may include three or more power generation devices. When the power generation facility includes n power generation devices, the first to n-th power generation devices are determined on the basis of Table 1. However, n is a natural number that is equal to or greater than 3. Then, the priority of the power generation device whose power generation amount is adjusted during the reverse power flow suppression process may be determined on the basis of the above-described example. Specifically, in Step S22, the amounts of power generated by the first to n-th power generation devices may be adjusted in ascending order of the priority. In Step S25, the amounts of power generated by the first to n-th power generation devices may be adjusted in descending order of the priority.

During the reverse power flow suppression process, the priority may be determined including the adjustment of the amount of power generated by the plurality of power generation devices and the adjustment of the amount of purchase of the power supplied from the power system 100. For example, when the power generation device includes a diesel power generation device only for sudden load fluctuations, the cost can be reduced by purchasing the power supplied from the power system 100 rather than adjusting the amount of power generated by the diesel power generation device. In this case, the operating cost of the diesel power generation device and the cost required to purchase power from the power system 100 may be compared to decide the priority for adjusting the amount of power generated.

In the above description, the adjustment valve is given as an example of the power generation amount adjustment unit. The power generation amount adjustment unit is not limited to the adjustment valve. For example, in geothermal power generation and binary power generation, power is generated by rotating a turbine with steam. In this case, a configuration may be adopted in which pressure is reduced by an adjustment valve (bypass valve) to reduce the output. A configuration may be adopted in which an output value from the turbine is left as it is and power is consumed by a resistor that is temporarily attached to a generator system.

The invention claimed is:

1. A power management system comprising:
at least one processor configured to:
control a power generation facility comprising power generation devices including a first power generation device and a second power generation device configured to generate power independently from the first power generation device; and
adjust an amount of supply of supply power to a load device which consumes generated power output by the power generation facility and the supply power supplied from a power system,
wherein the at least one processor is configured to control the power generation facility by:
determining whether or not to execute a process of reducing an amount of power generated by the power generation facility such that reverse power does not flow to the power system;
setting a priority for adjusting an amount of power generated by the first power generation device and the second power generation device of the power generation facility on the basis of a degree of fluctuation in load power predicted in the load device; and
controlling the power generation facility by adjusting the amount of power produced by each of the power generation devices based on a descending order of the priority when the process of reducing the amount of power generated by the power generation facility is determined to be executed.

2. The power management system according to claim 1, wherein the first power generation device is configured to generate power using first energy,
the second power generation device is configured to generate power using second energy different from the first energy, and
at least one of the first energy and the second energy is renewable energy.

3. The power management system according to claim 1, wherein the at least one processor is configured such that:
when it is predicted that an amount of fluctuation in the load power per unit time will be equal to or greater than a predetermined threshold value, the priority of the first power generation device is set to be higher than the priority of the second power generation device, and
when it is predicted that the amount of fluctuation in the load power per unit time will be less than the predetermined threshold value, the priority of the first power generation device is set to be lower than the priority of the second power generation device.

4. The power management system according to claim 3, wherein the at least one processor is configured to determine fluctuation in an amount of power generated due to a climate change of each of the power generation devices, wherein a power generation device having a smallest fluctuation is designated as the first power generation device.

5. The power management system according to claim 3, wherein the at least one processor is configured to determine a speed of increasing or decreasing all of the amount of power generated by each of the power generation devices, wherein power generation device having a quickest speed is designated as the first power generation device.

6. The power management system according to claim 5, wherein the first power generation device is configured to continuously adjust an amount of power generated, and
the at least one processor is configured to prohibit a shutdown of the first power generation device before the second power generation device is shut down when it is determined that a restart time of the first power generation device is later than a restart time of the second power generation device.

7. The power management system according to claim 1, wherein the at least one processor is configured to determine a cost of power generation of each of the power generation devices, wherein a power generation device having a highest cost is designated as the first power generation device.

8. The power management system according to claim 1, wherein the at least one processor is configured to determine a power generation capacity of each of the power generation devices, wherein a power generation device having a largest power generation capacity is designated as-the first power generation device.

9. The power management system according to claim 2, wherein the at least one processor is configured to determine a power generation capacity of each of the power generation devices, wherein a power generation device having a largest power generation capacity is designated as the first power generation device.

10. The power management system according to claim 3, wherein the at least one processor is configured to determine a power generation capacity of each of the power generation devices, wherein a power generation device having a largest power generation capacity is designated as the first power generation device.

11. The power management system according to claim 1, wherein the first power generation device is configured to continuously adjust an amount of power generated, and the at least one processor is configured to prohibit a shutdown of the first power generation device before the second power generation device is shut down when it is determined that a restart time of the first power generation device is later than a restart time of the second power generation device.

12. The power management system according to claim 1, wherein the at least one processor is configured to acquire data related to an energy storage device storing energy associated with the power generated by the power generation facility,
wherein the energy storage device is configured to output a constant output power to the load device, and
wherein when the amount of fluctuation in the load power per unit time is equal to or greater than the output power, the at least one processor sets the priority by determining that the amount of fluctuation is equal to or greater than the predetermined threshold value.

13. The power management system according to claim 12, wherein the at least one processor is configured to determine a power generation capacity of each of the power generation devices, wherein a power generation device having a largest power generation capacity is designated as the first power generation device.

14. The power management system according to claim 11, wherein the at least one processor is configured to determine a speed of increasing or decreasing all of the amount of power generated by each of the power generation devices, wherein a power generation device having a quickest speed is designated as the first power generation device.

15. The power management system according to claim 11, wherein the at least one processor is configured to determine a power generation capacity of each of the power generation devices, wherein a power generation device having a largest power generation capacity is designated as the first power generation device.

16. A power management method comprising:
controlling a power generation facility comprising power generation devices including a first power generation device and a second power generation device configured to generate power independently from the first power generation device; and
adjusting an amount of supply of supply power to a load device which consumes generated power output by the power generation facility and the supply power supplied from a power system,
wherein at least one processor controls the power generation facility by:
determining whether or not to execute a process of reducing an amount of power generated by the power generation facility such that reverse power does not flow to the power system;
setting a priority for adjusting an amount of power generated by the first power generation device and the second power generation device of the power generation facility on the basis of a degree of fluctuation in load power predicted in the load device; and
controlling the power generation facility by adjusting the amount of power produced by each of the power generation devices based on a descending order of the priority when the process of reducing the amount of power generated by the power generation facility is determined to be executed.

17. A non-transitory computer readable medium for a power management system, the non-transitory computer readable medium including processor-readable data and instructions to cause a computer to:
control a power generation facility comprising power generation devices including a first power generation device and a second power generation device configured to generate power independently from the first power generation device; and
adjust an amount of supply of supply power to a load device which consumes generated power output by the power generation facility and the supply power supplied from a power system,
wherein the computer is configured to control the power generation facility by:
determining whether or not to execute a process of reducing an amount of power generated by the power generation facility such that reverse power does not flow to the power system;
setting a priority for adjusting an amount of power generated by the first power generation device and the second power generation device of the power generation facility on the basis of a degree of fluctuation in load power predicted in the load device; and
controlling the power generation facility by adjusting the amount of power produced by each of the power generation devices based on a descending order of the priority when it is determined that the process of reducing the amount of power generated by the power generation facility is executed.

* * * * *